United States Patent
Hargreaves (10) Patent No.: US 7,031,886 B1
(45) Date of Patent: Apr. 18, 2006

(54) METHODS AND SYSTEMS FOR DETECTING NOISE IN A POSITION SENSOR USING MINOR SHIFTS IN SENSING FREQUENCY

(75) Inventor: Kirk Hargreaves, Mountain View, CA (US)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 11/013,220

(22) Filed: Dec. 14, 2004

(51) Int. Cl.
*G06F 15/00* (2006.01)
*H04B 1/00* (2006.01)

(52) U.S. Cl. ............ 702/191; 702/702; 702/189; 702/190; 375/350

(58) Field of Classification Search ........ 702/104, 702/116, 189, 190, 191, 193, 195, 197; 345/157, 345/159, 173; 178/18.01, 18.02; 375/320, 375/350
See application file for complete search history.

(56) References Cited

U.S. PATENT DOCUMENTS

| | | | |
|---|---|---|---|
| 4,698,461 A | 10/1987 | Meadows et al. | |
| 4,794,208 A | 12/1988 | Watson | |
| 4,922,061 A | 5/1990 | Meadows et al. | |
| 5,305,017 A | 4/1994 | Gerpheide | |
| 5,565,658 A | 10/1996 | Gerpheide et al. | |
| 5,831,600 A | 11/1998 | Inoue et al. | |
| 5,880,411 A * | 3/1999 | Gillespie et al. | 178/18.01 |
| 2004/0096014 A1 * | 5/2004 | Hendrix et al. | 375/320 |

* cited by examiner

Primary Examiner—Bryan Bui
(74) Attorney, Agent, or Firm—Ingrassia Fisher & Lorenz PC (57) ABSTRACT

Methods, systems and devices are described for detecting noise in a touchpad or other sensor that produces an output in response to a stimulus that is applied at or near a sensing region. According to various embodiments, a carrier signal is applied to the sensing region at two or more frequencies to thereby produce an output from the sensing region at each frequency. Each of the outputs is demodulated and filtered by a demodulation filter having a demodulation filter bandwidth. The various frequencies applied to the carrier signal are selected such that a difference between the frequencies is less than the demodulation filter bandwidth. At least some of the effects of the stimulus are removed from the outputs produced by the various carrier frequencies to produce two or more filtered outputs. The filtered outputs are then added, combined or otherwise processed to detect noise contained therein. If noise contained in one or more of the filtered outputs reaches an unacceptable level, the carrier signal may be shifted to a new sensing frequency for subsequent operation of the sensor.

36 Claims, 3 Drawing Sheets

METHODS AND SYSTEMS FOR DETECTING NOISE IN A POSITION SENSOR USING MINOR SHIFTS IN SENSING FREQUENCY

TECHNICAL FIELD

The present invention generally relates to position and proximity sensors such as touchpads, and more particularly relates to devices, systems and methods capable of detecting or avoiding noise present in such sensors.

BACKGROUND

Position sensors are commonly used as input devices for computers, personal digital assistants (PDAs), media players, video game players, consumer electronics, cellular phones, payphones, point-of-sale terminals, automatic teller machines, kiosks and the like. One common type of sensor used in such applications is the touchpad-type sensor, which can be readily found, for example, as an input device on many notebook-type computers. A user generally operates the sensor by moving a finger, stylus or other stimulus near a sensing region of the sensor. The stimulus creates a capacitive, inductive or other electrical effect upon a carrier signal applied to the sensing region that can be detected and correlated to the position or proximity of the stimulus with respect to the sensing region. This positional information can in turn be used to move a cursor or other indicator on a display screen, or for any other purpose. One example of a touchpad-type position sensor that is based on capacitive sensing technologies is described in U.S. Pat. No. 5,880,411, which issued to Gillespie et al. on Mar. 9, 1999.

Although position sensors have been widely adopted for several years, designers continue to look for ways to improve the sensors' functionality and effectiveness. In particular, difficulties have long been realized in identifying and reducing the effects of noise upon the sensor. Noise originates from various sources, including computer display backlights, power supplies, wireless communication devices and the like. Although many sensors now include low and/or high-pass filters that can effectively remove many types of noise, problems remain in identifying and removing noise components with frequencies that are close to the sensor sensing frequency or any of its harmonics. So called "tuned noise" is difficult to identify or filter out because the effective "beat" frequency of the tuned noise is often very close to the frequency of signals resulting from the user-applied stimulus itself, causing the tuned noise to appear as a stimulus applied to the sensing region. As a result, distinguishing the effects of undesirable tuned noise from the desirable effects of the stimulus can be quite difficult. Further, the time to observe tuned noise can be significant because the beat frequencies of such noise can be relatively low (e.g. on the order of 10 Hz or less), and therefore the period of an entire beat cycle can be significant (e.g. on the order of ten seconds for a beat frequency of 0.1 Hz).

Nevertheless, several techniques for reducing the effects of tuned noise have been attempted. One conventional noise avoidance technique involves comparing the output signals produced by operating the sensor at two or more different sensing frequencies when no stimulus is present on the sensing region, and then subsequently operating the sensor using the frequency that produces the lesser amount of noise. This technique has several disadvantages, however, in that determining whether the stimulus is present at any given time can be difficult in practice, particularly in the presence of significant external noise. Moreover, because this technique measures noise only when the stimulus is not present, sources of noise present within the stimulus itself (e.g. environmental radio frequency noise coupled to the sensor via the stimulus) are not considered. Another technique for measuring tuned noise involves periodically disabling the sensing function to ensure that no stimulus is detected, and then comparing the noise levels observed at two or more different operating frequencies. While this technique does measure noise coupled to the sensor via the stimulus, it does not address the issue of low beat frequencies. Further, the complexities introduced by disabling the sensing function can be relatively difficult and/or expensive to implement in practice.

Accordingly, it is desirable to provide systems and methods for quickly, effectively and efficiently detecting noise in a position sensor, even when the frequency of the noise is close to the sensing frequency. Moreover, it is desirable to create a noise detection technique that is effective even when a stimulus is present at or near the sensing region. Other desirable features and characteristics will become apparent from the subsequent detailed description and the appended claims, taken in conjunction with the accompanying drawings and the foregoing technical field and background.

BRIEF SUMMARY

Methods, systems and devices are described for detecting noise in a touchpad or other sensor that produces a modulated output in response to a stimulus that is applied at or near a sensing region. According to various embodiments, a carrier signal is applied at a sensing frequency at or near the carrier signal frequency of interest. The output of the sensor is demodulated, filtered and processed for noise. The carrier is then applied at a second, closely-spaced sensing frequency and is again demodulated, filtered and processed for noise. The sensing frequencies of the carrier signal are selected such that they are distinct from each other, and spaced within the bandwidth of the demodulation filter. In a further embodiment, the carrier signal may be shifted to a different carrier frequency and associated set of sensing frequencies if the noise identified by any of the applied sensing frequencies or some combination thereof exceeds an acceptable noise level. In such embodiments, a second set of closely-spaced sensing frequencies are chosen such that the frequencies are within the bandwidth of the demodulation filter but spaced apart from the first set of sensing frequencies. The above procedure may then be repeated for the second and/or other sets of closely spaced frequencies until an acceptable noise level is detected.

BRIEF DESCRIPTION OF THE DRAWINGS

Various aspects of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

According to various exemplary embodiments, a carrier signal having one of two or more closely spaced sensing frequencies is applied to a carrier modulating sensor, demodulated, filtered, and analyzed for noise. The same procedure is then applied for the remaining closely-spaced frequencies. The sensing frequencies are chosen such that they are spaced within the bandwidth of the demodulation filter but greater than the expected bandwidth of the stimulus. Regardless of the frequency of the applied carrier signal, the frequency bandwidth of the demodulated stimulus is mostly invariant, but the frequency band of the demodulated noise changes. Therefore, by filtering out the known bandwidth of the applied stimulus, the remaining signal can therefore be determined to be indicative of noise. By applying more than one sensing frequency, noise that has the same demodulated frequency band as the stimulus at one sensing frequency has a different frequency band for other sensing frequencies and is therefore detectable at the other frequencies. Unlike conventional noise detection, the sensing frequencies are chosen to emphasize noise near the carrier frequency of interest so the noise may be quickly observed. If the noise observed in one or more of the filtered signals is excessive or otherwise undesirable, it can be readily concluded that tuned noise is present at or near the carrier frequency of interest. Furthermore, if the stimulus is known to be low frequency, the noise after demodulation and filtering will have a high frequency characteristic which may be detected quickly. This is in contrast to many conventional noise detection techniques wherein a noise that is close in frequency to the carrier frequency produces a low frequency beat signal that can require a comparatively long time to detect.

Further, the noise detection techniques described herein can be used to improve the operation of a touchpad or other sensor capable of detecting the position and/or proximity of a stimulus. Tuned noise near a carrier frequency used in sensor operation can be detected by gathering sensing output at two or more sensing frequencies close to or the same as the carrier frequency of interest, and by filtering the outputs obtained at the various frequencies to remove the substantial effects of any stimulus that may be present. If one or more of the resulting filtered signals indicates an inordinate amount of noise, subsequent sensor operation is shifted to an entirely different carrier frequency that avoids the tuned noise detected. That is, minor frequency shifts near a carrier frequency of interest can be used to determine that there is a noise source near the carrier frequency, in which case a major shift in the carrier frequency may be beneficial. This process of evaluating noise levels may continue at the new carrier frequency (e.g. using two or more minor sensing frequencies near the new carrier frequency), with subsequent discovery of tuned noise at the new carrier frequency resulting in a return to the original carrier frequency or a major shift to a third carrier frequency of interest. Various types of sensors may apply any number of major and/or minor frequency shifts before finding a carrier frequency that is free of excessive tuned noise. Alternatively, the level of detected noise at the major frequencies may be used to choose the major frequency that has the least noise.

Figure 1:
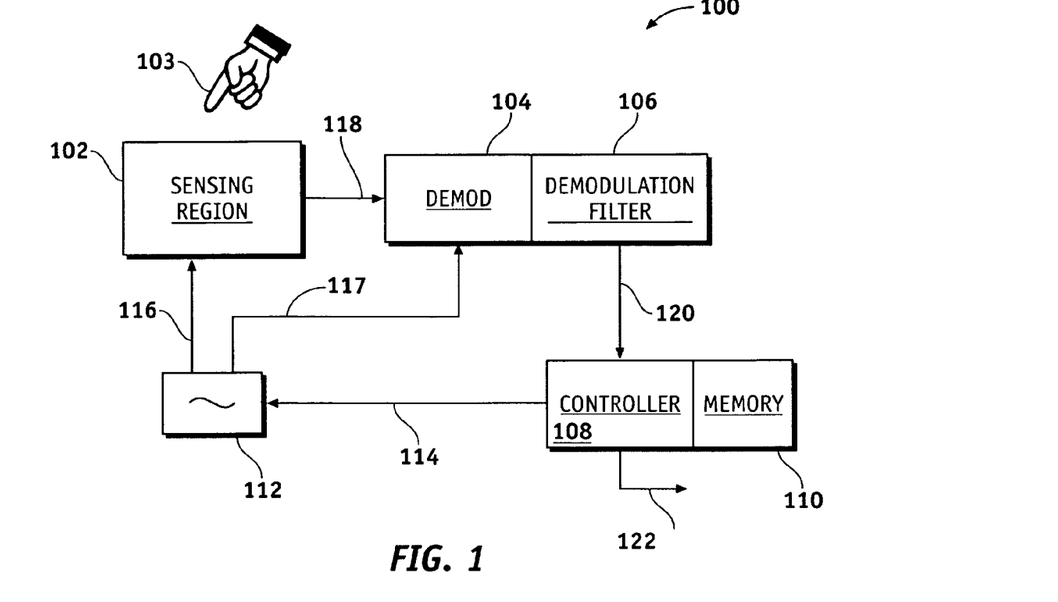
FIG. 1 is a block diagram showing an exemplary proximity sensing device.

Referring now to FIG. 1, an exemplary position sensor 100 suitably includes a sensing region 102, a demodulator 104, a controller 108, and a signal generator 112 as appropriate. In operation, sensor 100 senses a position of a finger or other object 103 in proximity to sensing region 102. Detecting a user input suitably involves obtaining position-related information about object 103 from sensor 102, and further processing the information to provide useful output indicia 122 to an external host, computing system and/or other device. The position of object 103 is appropriately obtained through the application of a carrier signal 116 to sensing region 102 to produce an electrical effect between sensing region 102 and object 103. This effect produces an output 118 that is indicative of the relative location of object 118 with respect to sensing region 102. Output 118 is demodulated by demodulator 104 using a demodulation signal 117 that is synchronous with carrier signal 116, and the demodulated signal 120 is received at controller 108, which suitably processes data 120 to provide suitable output indicia 122. An example of a technique for capacitively sensing and processing object position in a touchpad is set forth in U.S. Pat. No. 5,880,411, referenced above, although any other types of sensors and/or signal processing techniques could be used in a wide array of alternate embodiments. As used herein, the term "position sensor" is intended encompass not only conventional touchpad devices, but also a broad range of equivalent devices that are capable of detecting the position or proximity of a finger, pointer, stylus or other object 103. Such devices may include, without limitation, touch screens, touch pads, touch tablets, biometric authentication devices, handwriting or character recognition devices, and the like. Similarly, the terms "position" or "object position" as used herein are intended to broadly encompass absolute and relative positional or proximity information, and also other types of spatial-domain information such as velocity, acceleration, and the like, including measurement of motion in one or more directions. Various forms of positional information may also include time history components, as in the case of gesture recognition and the like. Accordingly, various types of "position sensors" 100 may be capable of detecting parameters other than the mere presence or absence of an object and may encompass a broad range of equivalents.

Sensing region 102 is any capacitive, resistive, inductive or other type of sensor that is capable of detecting the position or proximity of a finger, stylus or other object 103. Exemplary sensing regions 102 include the various sensors produced by Synaptics Inc. of San Jose, Calif., which appropriately detect a one dimensional, two dimensional or multi-dimensional position of an object 103 using capacitive or inductive coupling, although many other sensing regions 102 could be used in a wide array of alternate embodiments. Other types of sensing regions 102 capable of detecting position or proximity include sensors based upon acoustic, optical, or electromagnetic properties (e.g. radio frequency, infrared, ultraviolet or the like), for example, and/or any other effects. In an exemplary embodiment, object position is sensed in two dimensions (e.g. X and Y coordinates) of sensing region 102 using conventional capacitive or other sensing techniques.

Controller 108 is any processor, microcontroller, programmed circuitry or other module capable of processing input data 120 to extract output indicia 122 and/or control signals 114. The particular control circuitry 108 used varies widely from embodiment to embodiment, but in exemplary embodiments controller 108 is a model T1004, T1005, T100X or other microcontroller produced by Synaptics Inc.

of San Jose, Calif. Controller 108 suitably communicates with memory 110 as appropriate.

Memory 110 may be implemented with any random access memory (RAM), read only memory (ROM), flash memory, magnetic or optical storage device, or any other digital storage medium. Alternatively, the functions of memory 110 may be incorporated into controller 108 such that a physically distinct memory device 110 may not be present in all embodiments. In many embodiments, memory 110 suitably stores digital instructions in any software or firmware form that are executable by controller 108 to implement the various sensing, control and noise detection functions described herein.

Signal generator 112 is any device or circuit capable of providing carrier signal 116 and demodulation signal 117 of appropriate frequencies in response to control signals 114 received from controller 108. Although carrier signal 116 and demodulation signal 117 are typically synchronous with each other and indeed may coincide in some embodiments, the two signals may alternatively have different waveforms or other characteristics. In one embodiment suitable for use in a capacitively-sensing touchpad, signals 116 and 117 can be produced at frequencies that range from about 20–100 kHz, although these signals may be produced at any frequency or range in a wide array of equivalent embodiments. Although the terms "carrier frequency" and "sensing frequency" each refer to frequencies of carrier signal 116 and demodulation signal 117, "carrier frequency" as used herein generally refers to a major operating frequency of the carrier and demodulation signals, whereas "sensing frequency" used herein generally refers to a minor noise detection frequency. Certain sensing and carrier frequencies may coincide in various embodiments, as described more fully below.

Demodulator 104 is any circuit or other module capable of demodulating the output 118 of sensing region 102 using demodulation signal 117. Demodulator 104 may also include and/or communicate with a demodulation filter 106. Demodulation filter 106 may be implemented with any suitable low-pass or band-pass filter, including any sort of digital or analog filter, sampled or continuous time. In various embodiments, demodulation filter 106 is an analog filter having a bandwidth sufficient to remove high frequency noise components from output 118. Demodulation filter 106 could alternatively be implemented and/or supplemented by a digital filter (e.g. an averaging filter) implemented within controller 108. In an exemplary embodiment intended for use with carrier frequencies on the order of 10–50 kHz or so, demodulation filter 106 may have a bandwidth on the order of 150 to 500 Hz, although these exemplary values may vary widely from embodiment to embodiment. As described more fully below, the bandwidth of demodulation filter 106 may be useful in determining the particular demodulation frequencies used to detect noise in output 118, since beat frequencies that are significantly attenuated by filter 106 may not be properly detectable in controller 108. As a result, it is typically desirable to select demodulation frequencies that differ in frequency by a total amount that is less than the bandwidth of filter 106.

As described more fully above and below, noise signals propagating within sensor 100 are appropriately detected through the application of carrier signal 116 at various frequencies. The resulting outputs 118 from sensing region 102 are appropriately demodulated and filtered by demodulator 104 and filter 106, respectively, with the resulting signals 120 being provided to controller 108 for subsequent processing. Processor 108 suitably applies a high-pass filter to the received signals 120 to substantially remove the effects of any stimulus applied by object 103 at sensing region 102, and to thereby determine the amount of noise contained within the filtered signals. If the amount of noise observed is significant, controller 108 further provides a control signal 114 to signal generator 112 to direct the application of a carrier signal 116 at a different frequency.

Figure 2:
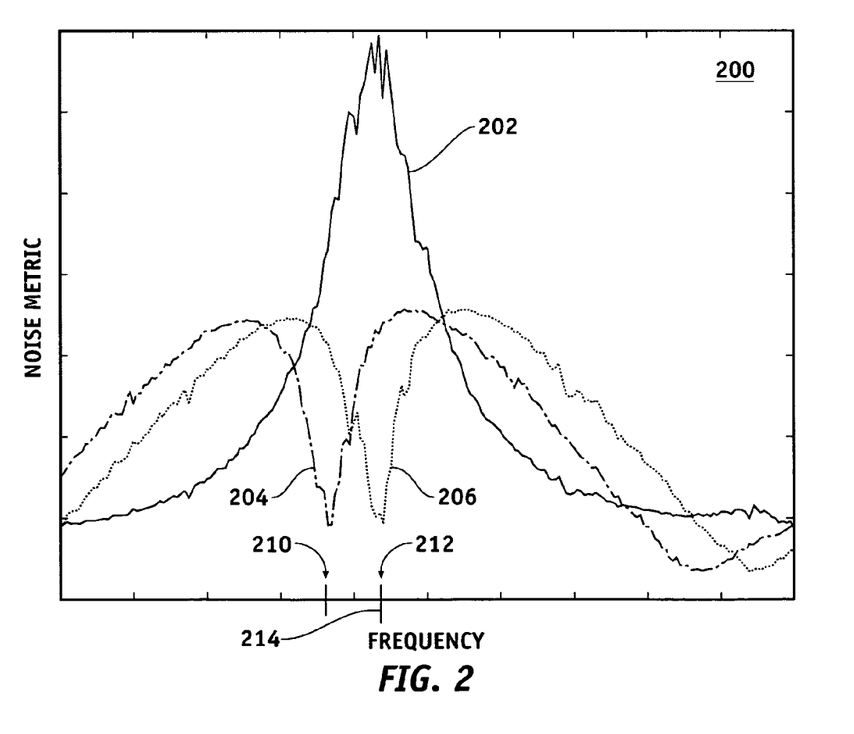
FIG. 2 is a plot showing an exemplary noise transfer function for a sensing device along with filter responsiveness for several exemplary high-pass filters.

With reference now to FIG. 2, plot 200 suitably shows an arbitrary noise transfer function 202 for an exemplary position sensor at carrier frequency 212 before an exemplary high pass filter, as well as the noise transfer functions 204 and 206 after an exemplary high-pass filter is applied at two different carrier frequencies 210 and 212 respectively. As can be appreciated from FIG. 2, the position sensor is highly susceptible to noise having frequencies at or near the carrier frequency 214. Although the tuned noise itself is generally a relatively high-frequency signal, such noise appears in the demodulated signal as a low "beat" frequency (e.g. at a frequency equal to the absolute difference between the noise frequency and the sensing frequency). Because beat frequencies produced by tuned noise approximate the frequencies of signals produced by the user-applied stimulus, such noise can be very difficult to remove from the sensor output using conventional filtering. That is, it can be very difficult in practice to mask the effects of noise at or near sensing frequency 214 without undesirably masking the effects of the user-applied stimulus at the same time. As a result, undetected tuned noise signals can have a significant adverse effect on sensor output.

Tuned noise at or near a carrier frequency of interest, however, can be more effectively detected by adjusting the beat frequency of the noise to a more detectable level. Because the beat frequency is related to the difference between the noise frequency and the sensing frequency, changes in the sensing frequency produce changes in the effective beat frequency of the noise. Shifting the sensing frequency by even a relatively slight amount, for example, can increase the difference between the sensing and noise frequencies, thereby allowing tuned noise at the original sensing frequency to appear as a higher frequency beat that is distinguishable from the effects of stimulus. To detect tuned noise at a particular frequency, the sensing frequency is adjusted to a slightly different frequency and a high-pass filter is applied to the sensing output to remove any effects of the stimulus that might be present without removing the higher beat frequency of the tuned noise. The resulting filtered signal therefore provides a very good measurement of tuned noise for a particular frequency, even when the stimulus is present on the sensing region. Moreover, the time required to detect the higher-frequency beat can be significantly less than the time to detect a low-frequency beat, further improving the noise responsiveness of the sensor. Even further, the high pass filter can be configured such that noise within a few bandwidths of the carrier frequency is emphasized and detectable. This allows the system to detect noise sources that may drift into the sensitive bandwidth of the carrier frequency.

Ensuring that the effects of the stimulus are removed, however, can be complicated by the operating characteristics of the filter applied. Referring to the exemplary filter response curves 204 and 206 in FIG. 2, for example, the filter shown is relatively unresponsive to noise observed at or near the sensing frequency (e.g. frequencies 210 and 212 for curves 204 and 206, respectively). Applying the filter at two or more different sensing frequencies, however, mitigates the effect of this unresponsive region, provided that demodulation frequencies 210 and 212 are sufficiently different so that the unresponsive portions of curves 204 and 206 are non-overlapping. Stated another way, frequencies 210 and 212 can be selected such that non-observable noise at one sensing frequency is observable at another. As a result, tuned noise corresponding to either sensing frequency 110 or 112 will be detectable at another sensing frequency. Further, because the portion of sensing output 118 produced by the stimulus does not typically change significantly with the sensing frequency, the noise present in output 118 can be readily distinguished from the effects of the stimulus present in the same signal. By applying a high-pass filter, the effects of the stimulus can be substantially filtered or otherwise removed from sensing region output 118, resulting in a filtered signal that is indicative of the amount of tuned noise present in sensor 100. Because the filter may be insensitive to noise at certain tuned frequencies, however, the filter is applied at two or more different frequencies to improve the likelihood that noise will be observed in at least one of the demodulated outputs. Hence, filtering (or otherwise removing) the effects of the stimulus from the sensing outputs generated at two sensing frequencies of the carrier signal, tuned noise at or near the carrier frequency of interest can be readily detected and/or quantified. This information, in turn, can be used to adjust subsequent sensor operation as appropriate.

Figure 3:
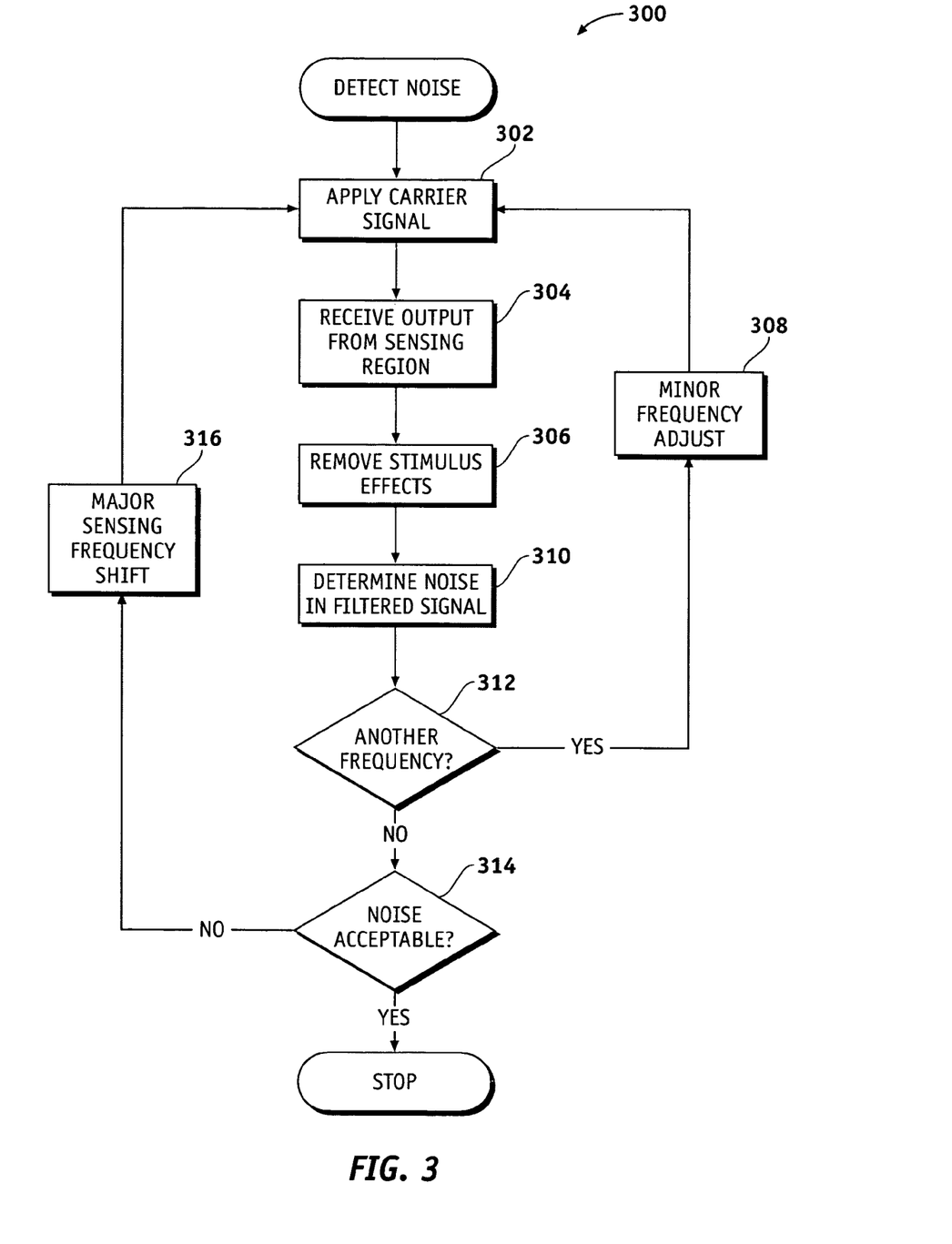
FIG. 3 is a flowchart of an exemplary method for detecting noise in a proximity sensing device.

FIG. 3 is a flowchart of an exemplary process 300 for detecting noise in signals 118 output from sensing region 102. While many of the functions described in FIG. 3 may be computer-implemented using software or firmware instructions, FIG. 3 is intended to illustrate various exemplary functions in logical form, and is not intended to necessarily present a literal implementation of a software routine. Accordingly, the various modules, functions and routines shown in FIG. 3 may be enhanced, eliminated and/or differently organized in the many alternate practical embodiments. The various steps and modules set forth in process 300 may be implemented using any computer language, modules, applications, instructions or the like, and may be stored permanently or temporarily in memory 110 (FIG. 1) and/or in any other digital storage medium including a floppy disk, CD-ROM, RAM, ROM, optical or electromagnetic mass storage device, or the like. The instructions used to implement various portions of process 300 may also be transmitted as modulated signals on carrier waves transmitted across any communications medium such as a digital network, wireless link, or the like.

With reference now to FIG. 3, an exemplary process 300 for detecting noise in a position or proximity sensor 100 suitably includes the broad steps of applying carrier signal 116 to sensing region 102 at a number of different sensing frequencies (step 302) to generate a number of outputs from the sensing region (step 304), substantially removing the effects of any stimulus provided by the user (step 306), and processing the resulting filtered signals to identify the presence of any tuned noise (step 310). Noise can be detected using any number of minor frequency shifts at or near the carrier frequency of interest (steps 312 and 308). In various further embodiments, a major shift of the carrier frequency takes place (step 316) if one or more of the filtered outputs produced by the applied signals contains an unacceptable or non-optimum level of noise so that subsequent sensor operation takes place using a carrier frequency that avoids some or all of the identified tuned noise.

Carrier signal 116 is applied to sensing region 102 in any manner (step 302). In various embodiments, controller 108 (FIG. 1) provides a command signal 114 to signal generator 112 to direct the generation and application of carrier signals 116 having various frequencies. As described above, carrier signal 116 is applied to sensing region 102 and demodulation signal 117 is applied to demodulator 104 as appropriate to obtain demodulated output signals from the sensing region. The various outputs 118 produced in response to the various frequencies of carrier signal 116 are ultimately received (step 304) at controller 108 in any appropriate manner. In various embodiments, outputs 118 from sensing region 102 are demodulated and filtered as described above, with the resulting signals 120 provided to controller 108 for storage (e.g. in memory 110) and/or processing.

To determine the amount of noise present within output 118, any effects of the user stimulus applied to sensing region 102 are substantially removed from the sensing output (step 306). While many sources of high-frequency noise can be removed from signals 118 using demodulation filter 106, filter 106 cannot typically remove tuned noise present in signals 118 due to the beat frequency issues described above. In various embodiments, a high-pass filter is applied to the received data signals to effectively remove signal components having very low frequencies. Most human-applied stimuli have effective frequencies on the order of 20 Hz or less, so any high-pass filter capable of removing such relatively low frequencies from outputs 118 could be used to extract the low-frequency effects of the stimulus and thereby isolate the effects of tuned noise. In various embodiments, a high-pass filter is implemented using digital filtering techniques executed within controller 108. A simple digital difference filter, for example, effectively removes low frequency components in output 118. The differences are processed over any suitable period of time to determine a noise metric. For example, the maximum absolute value of the differences over some time period may be recorded. Alternatively, the average absolute value may be computed. More conventionally, the root mean square or mean square value of the differences may be calculated. Alternatively, a high-pass filter may be implemented using data sampling techniques (e.g. by selecting a data sampling length that is short enough to effectively exclude low frequency components in the sampled signal) or through other digital and/or analog filtering techniques. In still other embodiments, the stimulus effects may be additionally or alternatively removed by disabling the sensing function of sensing region 102 (e.g. by turning off a current source providing electrical power to sensing region 102, or in any other manner).

"Substantially removed" in the context of stimulus filtering generally refers to removing the effects of the stimulus that are intended by the user. As briefly mentioned above, the stimulus may actually provide a path for spurious noise, and it may be desirable in many embodiments to detect this noise. Although such noise technically results from the application of the stimulus, it is not generally an intended effect, and hence may not be removed by the high-pass filter in all embodiments.

When the substantial effects of the stimulus are removed from the filtered signals, the remaining noise may be determined in any manner (step 310) resulting in a noise metric. If the carrier frequencies are selected in accordance with the concepts set forth above, for example, the collective filtered signals represent tuned noise existing near the carrier frequency of interest. That is, since the effects of the stimulus are substantially removed from the signal being evaluated, any filtered signal remaining results from tuned noise near the frequency of interest. As a result, the filtered signals can be individually and/or collectively processed in any manner to determine the amount of tuned noise present within the sensor. The noise metric for each carrier frequency can be individually compared against a suitable noise threshold, for example, to determine whether any individual filtered signal represents an unacceptable level of noise. Alternatively (or additionally), two or more noise metrics can be summed, averaged or otherwise intercombined in any appropriate manner for subsequent processing. The noise metrics obtained at different sensing frequencies can be added together, for example, and the total compared to an appropriate threshold value to simultaneously determine whether tuned noise is present within one or more filtered signals, or to determine the total amount of noise observed near a particular carrier frequency of interest. The various filtered signals may therefore be processed singly or in combination to identify tuned noise in any appropriate manner.

As described more fully above, obtaining output data from sensing region 102 at various sensing frequencies ensures that tuned noise lying at or near one of the sensing frequencies is detected in the outputs obtained at the other frequency. Detecting tuned noise therefore involves applying the carrier signal at two or more different sensing frequencies (steps 312 and 308). The particular sensing frequencies applied may be selected in any manner. In various embodiments, the applied frequencies are predetermined by software code or other settings in controller 108, for example, or may be determined based upon some relationship to the operating frequency of interest. Various frequency hopping or strobing techniques could also be used to apply carrier signals having frequencies determined randomly, pseudo-randomly, sequentially or in any other manner. As mentioned above, the difference between the highest and lowest demodulation frequencies should be less than the bandwidth of demodulation filter 106 to prevent the demodulation filter from removing tuned noise components. Further, the various demodulation frequencies should be spaced apart to ensure that the non-responsive ranges of the high-pass filters applied do not overlap. Stated another way, the sensing frequencies should be selected such that tuned noise components (e.g. the beat frequencies produced by noise signals at or near one of the sensing frequencies) in output 118 are passed by both the high-pass filter and demodulation filter 106 for at least one of the frequencies 210 and 212 even though the substantial effects of any applied stimulus are removed by the high-pass filter.

In touchpad and other position/proximity sensor implementations, each potential carrier frequency used for sensor operation is evaluated at two or more sensing frequencies that approximate the carrier frequency of interest. While the carrier frequency of interest could be used as one of the sensing frequencies, this is not necessary in all embodiments. If the amount of noise identified in one or more filtered signals obtained from the applied sensing frequencies exceeds an acceptable level (step 314), the carrier frequency is appropriately shifted to an alternate value (step 316) to allow subsequent operation at a carrier frequency that avoids the tuned noise. The sensor may continue to detect noise at the new carrier frequency using the same or similar techniques. Through application of minor frequency adjustments (steps 312 and 308), then, the amount of tuned noise present at a particular carrier frequency can be evaluated, and major frequency shifts (steps 314, 316) can be applied only when needed to avoid tuned noise. Alternatively, noise metrics could be gathered for two or more operating carrier frequencies, with subsequent operation taking place at the carrier frequency that contains the least amount of detected noise. In such embodiments the selected carrier frequency may be subject to some effects of tuned noise, but typically these effects will be at acceptable levels and/or will be less than tuned noise observed at other carrier frequencies. Major frequency shift 316, then, need not necessarily result from a comparison of a noise metric to a threshold value in step 314, but may equivalently occur as a result of a comparison of noise metrics gathered at various carrier frequencies, or according to any other scheme or technique.

The various steps of routine 300 may be applied in any temporal order, or may be otherwise altered in any manner across a wide array of alternate embodiments. Any number of sensing and/or carrier frequencies could be evaluated and/or applied, for example, with the various carrier signal frequencies being applied continuously, sequentially, simultaneously, periodically, aperiodically, as-needed or on any other temporal basis. Further, the various steps shown in FIG. 3 could be combined or otherwise differently organized in any manner. Steps 312 and 314, for example, could be combined for embodiments that continuously detect tuned noise. Such an embodiment may produce a minor frequency shift when step 310 identifies acceptable noise levels, for example, and a major frequency shift when step 310 identifies unacceptable noise levels. Similarly, steps 306 and 310 could be performed after step 312 in other embodiments.

Figure 4:
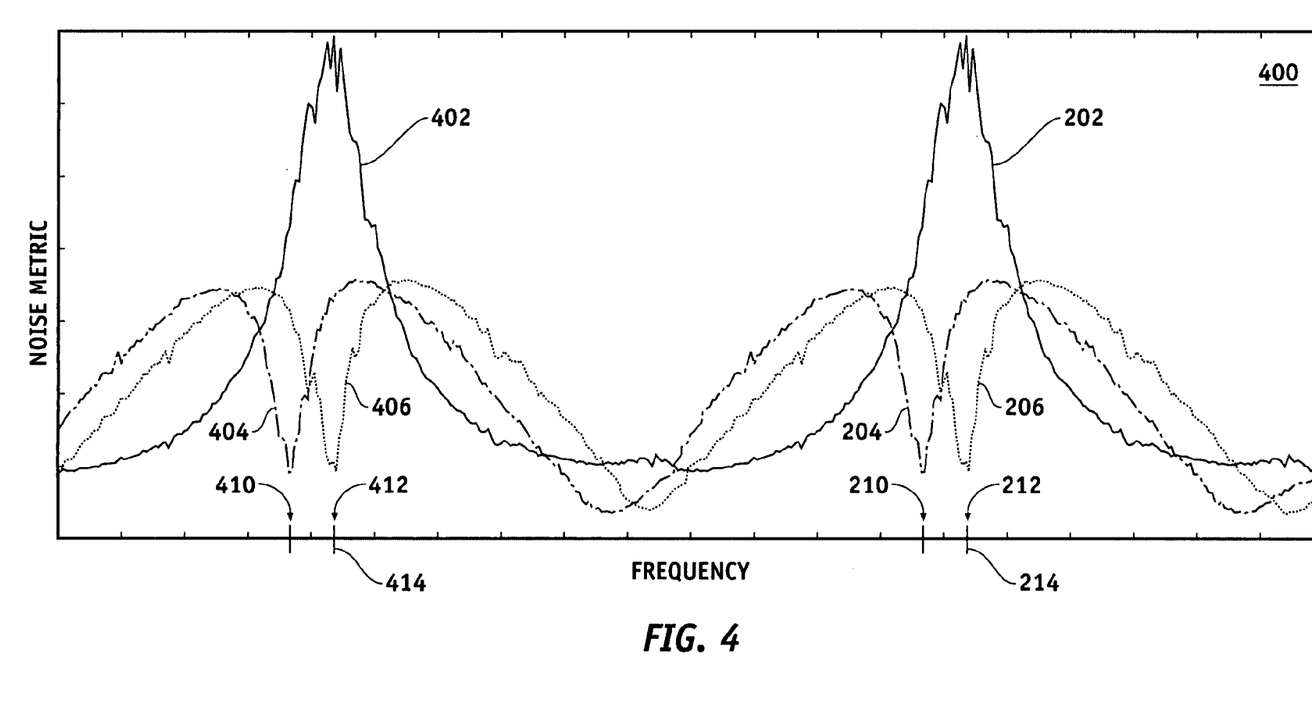
FIG. 4 is a plot showing exemplary noise transfer functions and filter responsiveness for a sensing device having at least two primary sensing frequencies.

With final reference now to FIG. 4, a noise transfer function 400 for a touchpad or other position/proximity sensor suitably includes two peaks 202 and 402 indicating relatively high susceptibility to noise near either of two primary carrier frequencies 214 and 414, respectively. As the sensor operates at either primary carrier frequency, controller 108 attempts to determine whether tuned noise is present using the techniques described above. The determination is made on any periodic, aperiodic, random or other temporal basis, or may be performed on a continuous basis as appropriate. To determine whether tuned noise exists near sensing frequency 214, for example, the sensing signal is applied at two or more sensing frequencies 210, 212 that are relatively near (e.g. within the bandwidth of demodulation filter 106 in FIG. 1) the operating frequency 214 of the carrier signal. As carrier signal 116 is applied at each sensing frequency, the resulting outputs from sensing region 102 are demodulated, filtered and noise processed as described above. If noise is identified in one or more resulting filtered signals, an alternate carrier frequency 414 can be used for subsequent operation. As mentioned above, tuned noise detection may continue at the alternate carrier frequency 414 (e.g. using sensing frequencies 410 and 412) as appropriate. Major frequency shifts (e.g. shifts between carrier frequencies 214 and 414) may be triggered in any manner. Such shifts could result from the detection of an unacceptable level of noise, for example. Alternatively, the carrier frequency used for subsequent operation may be selected as the carrier frequency with the lowest level of detected noise, and/or according to any other criteria as appropriate. Although FIG. 4 shows sensing frequencies 212 and 412 coinciding with carrier frequencies 214 and 414, respectively, this is not necessary in practice. Indeed, any carrier and/or sensing frequency arrangement may be used in a wide array of alternate embodiments. Further, although FIG. 4 shows two sensing frequencies near each carrier frequency, any number of sensing frequencies could be used to detect noise in proximity to any number of carrier frequencies in various alternate embodiments. By evaluating filtered noise signals obtained at two or more closely-spaced sensing frequencies associated with each carrier frequency of interest, the carrier frequency with the least susceptibility to tuned noise can be readily selected.

Using the techniques set forth above, the operation of a touchpad or other sensor can be significantly improved by quickly detecting tuned noise and/or by avoiding such noise for subsequent operation. Various techniques described herein further allow for the removal of stimulus effects from noise detection, thereby allowing for noise detection even when a stimulus is present at or near sensing region 102. Moreover, by increasing the beat frequency of the tuned noise (and thereby shortening the period of the noise signal), the noise can be detected relatively quickly.

Accordingly, there are provided numerous systems, devices and processes for detecting noise and/or for avoiding noise in a position sensing device such as a touchpad. While at least one exemplary embodiment has been presented in the foregoing detailed description, it should be appreciated that a vast number of variations exist. The various steps of the noise detection and reduction techniques described herein, for example, may be practiced in any temporal order, and are not limited to the order presented and/or claimed herein. It should also be appreciated that the exemplary embodiments described herein are only examples, and are not intended to limit the scope, applicability, or configuration of the invention in any way. Various changes can therefore be made in the function and arrangement of elements without departing from the scope of the invention as set forth in the appended claims and the legal equivalents thereof.

What is claimed is:

1. A method of detecting noise in an output provided by a sensing region configured to modulate a carrier signal in response to the proximity of a stimulus, wherein the output is synchronously demodulated with the carrier signal and filtered by a demodulation filter having a demodulation filter bandwidth, the method comprising the steps of:
   applying the carrier signal at a first frequency and at a second frequency to thereby produce a first output and a second output, respectively, wherein the first and second frequencies are distinct from each other and wherein a difference between the first and second frequencies is less than the demodulation filter bandwidth;
   removing at least some of an effect produced by the stimulus from the first and second outputs to thereby produce a first and a second filtered output, respectively; and
   processing the first and second filtered outputs to detect noise contained therein.

2. The method of claim 1 wherein the removing step comprises applying a high-pass filter to the first and second outputs.

3. The method of claim 2 wherein the high-pass filter is a difference filter.

4. The method of claim 1 wherein the removing step comprises temporarily disabling sensing functionality of the sensing region.

5. The method of claim 1 wherein the removing step comprises sampling the output with a sampling length configured to substantially exclude the effect produced by the stimulus.

6. The method of claim 1 further comprising the step of adjusting the frequency of the carrier signal applied to the sensing region when sufficient noise is identified by the processing step.

7. The method of claim 6 wherein the adjusting step comprises applying the carrier signal at a third frequency that is distinct from the first and second frequencies.

8. The method of claim 7 wherein the third frequency differs from the first and second frequencies by an amount greater than the demodulation filter bandwidth.

9. The method of claim 7 wherein the adjusting step further comprises applying the carrier signal at a fourth frequency that is distinct from the first, second and third frequencies.

10. The method of claim 9 wherein the difference between the third and fourth frequencies is less than the demodulation filter bandwidth.

11. The method of claim 10 wherein the third and fourth frequencies differ from the first and second frequencies by an amount greater than then demodulation filter bandwidth.

12. The method of claim 1 wherein the processing step comprises identifying noise contained in at least one of the filtered outputs.

13. The method of claim 12 wherein the processing step further comprises identifying noise contained in both of the filtered outputs.

14. The method of claim 1 wherein the processing step comprises the steps of adding the filtered outputs to produce a total filtered output, and comparing the total filtered output to a threshold noise value.

15. A position sensor configured to execute the method of claim 1.

16. A touchpad configured to execute the method of claim 1.

17. A method of operating a sensor configured for detecting a user input in proximity to a sensing region demodulated by a carrier signal having a sensing frequency and filtered by a demodulation filter having a demodulation filter bandwidth, the method comprising the steps of:
   applying a plurality of carrier signals to the sensing region to produce a plurality of noise measurement signals, wherein each of the plurality of carrier signals has a distinct frequency, and wherein a total difference in the distinct frequencies is less than the demodulation filter bandwidth;
   filtering each of the plurality of noise measurement signals to substantially remove at least some of an effect produced by the user input, thereby producing a plurality of filtered outputs;
   determining an amount of noise identified in at least one of the plurality of filtered outputs; and
   shifting the sensing frequency to an alternate sensing frequency if the amount of noise exceeds a predetermined threshold.

18. The method of claim 17 wherein each of the distinct frequencies of the plurality of carrier signals approximates the sensing frequency.

19. The method of claim 17 wherein the sensing frequency and the alternate sensing frequency differ by an amount greater than the demodulation filter bandwidth.

20. The method of claim 17 wherein the filtering step comprises applying a high-pass filter to each of the plurality of noise measurement signals.

21. The method of claim 20 wherein the high-pass filter is a difference filter.

22. The method of claim 17 wherein the applying step is executed periodically.

23. The method of claim 17 wherein the amount of noise comprises a total amount of noise contained within the plurality of filtered outputs.

24. The method of claim 17 wherein the sensor is a position sensor.

25. The method of claim 17 wherein the sensor is a touchpad.

26. A software application configured to detect noise in an output provided by a sensing region configured to modulate a carrier signal in response to the proximity of a stimulus, wherein the output is synchronously demodulated with the carrier signal and filtered by a demodulation filter having a demodulation filter bandwidth, the software application comprising:
- a first code module configured to direct the application of a carrier signal at a first frequency and at a second frequency to the sensing region to thereby produce a first output and a second output, respectively, wherein the first and second frequencies are distinct from each other and wherein a difference between the first and second frequencies is less than the demodulation filter bandwidth;
- a second code module configured to remove at least some of an effect produced by the stimulus from the first and second outputs to thereby produce a first and a second filtered output, respectively; and
- a third code module configured to process the first and second filtered outputs to detect noise contained therein.

27. A digital storage medium having the software application of claim 26 stored thereon.

28. A position sensor comprising a processor and a memory, wherein the memory is configured to store the software application of claim 26 for execution by the processor.

29. An input device for detecting a user input, the input device comprising:
- a sensing region configured for detecting the user input and for providing an output in response thereto;
- a signal generator configured to produce a carrier signal having a sensing frequency;
- a demodulator coupled to the sensing region and configured for demodulating the output of the sensing region with the carrier signal;
- a demodulation filter associated with the demodulator and having a demodulation filter bandwidth; and
- a processor in communication with the signal generator and the demodulation filter, wherein the processor is configured:
  - to communicate with the signal generator to direct the application of the carrier signal at a first frequency and at a second frequency to the sensing region, wherein the first and second frequencies are distinct from each other and wherein a difference between the first and second frequencies is less than the demodulation filter bandwidth;
  - to receive a first and a second noise measurement signal from the demodulation filter in response to the first and second frequencies, respectively;
  - to substantially remove any effects of the user input from the first and second noise measurement signals to thereby produce a first and a second filtered output, respectively; and
  - to determine an amount of noise identified in at least one of the first and second filtered output and to communicate with the signal generator to shift the sensing frequency to an alternate sensing frequency if the amount of noise exceeds a predetermined threshold.

30. The input device of claim 29, wherein the input device is a position sensing device.

31. The input device of claim 30 wherein the sensing region is defined by a capacitive touch sensor.

32. The input device of claim 29, wherein the input device is a touchpad.

33. An apparatus configured to detect noise in an output of a capacitive sensor that is configured to respond to a stimulus provided in proximity to the sensing region, wherein the output is filtered by a demodulation filter having a demodulation filter bandwidth, the apparatus comprising:
- means for directing the application of a carrier signal at a first frequency and at a second frequency to the sensing region to thereby produce a first output and a second output, respectively, wherein the first and second frequencies are distinct from each other and wherein a difference between the first and second frequencies is less than the demodulation filter bandwidth;
- means for removing effects of the stimulus from the first and second outputs to thereby produce a first and a second filtered output, respectively; and
- means for processing the first and second filtered outputs to detect noise contained therein.

34. A sensor configured for detecting a user input in proximity to a sensing region demodulated by a carrier signal having a sensing frequency and filtered by a demodulation filter having a demodulation filter bandwidth, the sensor comprising:
- means for applying a plurality of carrier signals to the sensing region to produce a plurality of noise measurement signals, wherein each of the plurality of carrier signals has a distinct frequency, and wherein a total difference in the distinct frequencies is less than the demodulation filter bandwidth;
- means for filtering each of the plurality of noise measurement signals to substantially remove any effects of the user input, thereby producing a plurality of filtered outputs;
- means for determining an amount of noise identified in at least one of the plurality of filtered outputs; and
- means for shifting the sensing frequency to an alternate sensing frequency if the amount of noise exceeds a predetermined threshold.

35. The sensor of claim 34 wherein the sensing region comprises means for capacitively sensing the user input.

36. The sensor of claim 34 wherein the sensing region comprises means for inductively sensing the user input.

* * * * *